Patented Jan. 29, 1946

2,393,888

UNITED STATES PATENT OFFICE 2,393,888

SEPARATION OF XYLENES

Percy Julius Cole, Philadelphia, Pa., assignor to Allied Chemical & Dye Corporation, New York, N. Y., a corporation of New York No Drawing. Application May 21, 1943, Serial No. 487,973

4 Claims. (Cl. 260—674)

This invention relates to the separation of meta-xylene from mixtures thereof with other xylenes.

Xylenes are obtained commercially from various natural sources such as coke-oven distillate, petroleum and drip oil (i. e. oil which accumulates in gas mains). A xylene oil thus obtained ordinarily contains all three xylenes. By fractional distillation of such a xylene mixture a large fraction of the orthoxylene present may be selectively removed, but it has not been possible to separate and recover commercially pure meta-xylene in this way.

It has been proposed to bring about separation of meta-xylene from a xylene mixture by a method involving partial sulfonation of the xylene mixture, whereby meta-xylene is to some degree selectively sulfonated, and separation of the sulfonated xylene, primarily meta-xylene, from the unsulfonated oil, primarily other xylenes. Prior art methods of this type, however, have been found to be unsatisfactory in that the sulfonation is not sufficiently selective for meta-xylene, and the amount of acid and length of time required for sulfonation are excessive. Such processes have therefore been uneconomical and have given only low yields of impure meta-xylene product.

It is an object of this invention to provide a new economically attractive process for separating substantially pure meta-xylene in good yield from a mixture of xylenes.

I have discovered that substantially pure meta-xylene may be readily separated in good yield from a mixture of xylenes by a selective sulfonation process in which no more than the theoretical amount of sulfuric acid required for reaction with meta-xylene to form the xylene monosulfonic acid is employed; this process involves refluxing a mixture of the xylene and the theoretical amount of sulfuric acid required for meta-xylene sulfonation, in the form of an aqueous solution having initially a sulfuric acid concentration of about 50% to 70%, preferably about 60% concentration, at a temperature in the range of 85° to 95° C., preferably about 90° C., separating from the reflux condensate water formed in the sulfonation reaction, and continuing reflux distillation while maintaining the temperature not higher than about 95° C., preferably not higher than about 90° C., with separation of water from the condensate, until substantially all the sulfuric acid has been reacted. When the sulfonation reaction is complete, unreacted xylenes are removed, for example by distillation, and the residual meta-xylene sulfonic acid is hydrolyzed, preferably by steam distillation up to an end temperature of about 140° to 150° C., to produce a substantially pure meta-xylene product.

My invention is thus based on the surprising discovery that, by carefully regulating conditions of reaction such as initial acid concentration and the temperature maintained during removal of water formed by the sulfonation reaction, e. g. the temperature maintained during the above-described reflux distillation, the sulfonation may be made substantially completely selective for meta-xylene, using only the theoretical amount of sulfuric acid for reaction with meta-xylene, and the time of sulfonation may be quite short, whereas partial sulfonations of mixed xylenes described in the prior art require a long sulfonation time, use a large excess of concentrated acid, and show only partial selectivity for meta-xylene; that is, the sulfonated product always contains a substantial proportion of xylene sulfonic acids other than meta-xylene sulfonic acid. In the process of my invention meta-xylene of substantially 100% purity is produced.

The process of my invention may be applied to any industrial xylene mixture; for example, the xylene fraction of coke-oven distillates, drip oil, water-gas tar and oil-gas-tar oils, similar light oils containing aromatic hydrocarbons, the aromatic fraction of petroleum hydrocarbons, and other sources of aromatic hydrocarbons of the benzene series. A xylene oil which contains all three xylenes may, if desired, first be fractionated to obtain a fraction somewhat enriched in meta-xylene; the process of my invention, however, is applicable to any xylene mixture containing a substantial proportion of meta-xylene. Nitration xylene, a refined xylene mixture boiling from about 138° to 140° C., low in paraffin hydrocarbons, is a commercially available xylene mixture that may be advantageously treated by the process of my invention.

In a preferred method of carrying out the process of my invention, a mixed xylene oil and the theoretical amount of sulfuric acid for monosulfonation of the meta-xylene content of the oil, the sulfuric acid being in the form of an aqueous solution of concentration about 50% to 70%, preferably 60% concentration, are mixed and refluxed together under vacuum, preferably at an absolute pressure in the neighborhood of about four inches of mercury to hold the temperature in the range of about 85° to 95° C., preferably about 90° C. The vapor passing up into the reflux condenser consists essentially of an azeotropic mixture of water and xylenes. The condensate from the reflux condenser is sent to a continuous separator to remove water and return dry xylene to the reactor. The operation is complete when the amount of water separated corresponds to the water added with the sulfuric acid, plus the water formed in the sulfonation reaction. By employing the indicated initial concentration of sulfuric acid and removing water by reflux distillation during the sulfonation while maintaining the temperature within the indicated range, the concentration of sulfuric acid in the aqueous phase of the reaction mixture is automatically controlled at the optimum point for selective sulfonation of meta-xylene.

The reaction mixture is then treated to separate the unsulfonated hydrocarbons. This may advantageously be done by distillation. I have found it preferable to add water to aid in distilling off the hydrocarbons and, to avoid partial hydrolysis, to subject the mixture to distillation under reduced pressure so as to maintain the distillation temperature below about 100° C., preferably about 90° C.

After removal of unsulfonated hydrocarbons, the residue generally consists of a mixture of water and meta-xylene sulfonic acid of relatively high purity. The bulk of the water is preferably removed by distillation under atmospheric pressure before hydrolysis of the sulfonic acid. In the preferred method of carrying out the process of the invention, the meta-xylene sulfonic acid is then hydrolyzed by passing steam therethrough up to an end temperature in the neighborhood of 140° to 150° C. This limitation of the temperature during hydrolysis of the sulfonic acid by steam distillation, I have found, produces a substantially 100% pure meta-xylene product as distillate. When oil ceases to distil over, the receiver is changed and the temperature raised to hydrolyze any residual sulfonic acid. A very small amount of hydrocarbon, e. g., para-xylene, may thus be obtained. The still residue consists of sulfuric acid which may be concentrated for use in a subsequent sulfonation operation.

The following example is illustrative of the process of my invention:

500 parts, by volume, of nitration xylene (52.5% meta-xylene, 21.5% para-xylene, 20% ortho-xylene, and about 6% of other aromatics and paraffins), were mixed with 100 parts, by volume, of 66 Bé. sulfuric acid (C. P.) and 104 parts water. This is equivalent to an aqueous sulfuric acid solution of 60% concentration. The charge was placed in a still, subjected to mechanical agitation, and refluxed under a vacuum of about 26" mercury (4" mercury absolute pressure). The temperature of the liquid was maintained just under 90° C. The condensate from the reflux condenser was sent to a continuous separator to remove water and return dry xylene to the reactor. After about 16 hours of refluxing the required amount of water (the 104 parts of water charged, plus 34 parts of water formed in the sulfonation reactor) had been collected, indicating complete consumption of the sulfuric acid.

Unreacted xylenes were removed by diluting the reaction mixture with twice its volume of water and heating under a vacuum of 26"; the highest temperature reached during removal of unreacted xylenes was about 100° C. A total of about 252 parts, by volume, of unreacted xylenes was collected. This material is referred to in the table below as "unsulfonated oil."

The residual meta-xylene sulfonic acid was then distilled under atmospheric pressure until a temperature of 140° C. was reached in the liquid, whereupon steam was injected to maintain a constant temperature of 140° C., and distillation was continued until the distillate ran free of oil. There were collected in all during this distillation: 155 parts, by volume, of xylene and 1665 parts of water. This xylene distillate is referred to in the table below as "meta-distillate."

The residual sulfonic acid from the hydrolysis for removal of meta-xylene was then diluted with an equal volume of water and distilled over a temperature range of 140°-190° C. 25 parts by volume of oil were collected. This material is referred to in the table below as "non-meta in sulfonate."

An analysis of the meta-xylene product and other materials produced in the process of the example is tabulated below:

| Product | Parts by volume amount | Percent meta-xylene | Percent para-xylene | Percent other hydro-carbons |
|---|---|---|---|---|
| Meta-distillate | 155 | 99.4 | 0.6 | 0 |
| Non-meta in sulfonate | 25 | Trace | 19.0 | 81— |
| Unsulfonated oil | 252 | 13.8 | 36.8 | 49.4 |

From the above tabulation it is seen that a meta-xylene product of better than 99% purity was obtained in better than 68% yield.

Since certain changes may be made in carrying out the above process without departing from the scope of the invention, it is intended that all matter contained in the above description shall be interpreted as illustrative and not in a limiting sense.

I claim:

1. A process for separating substantially pure meta-xylene from an oil comprising a mixture of xylenes including meta-xylene, which comprises selectively sulfonating meta-xylene in said xylene oil by heating a mixture of said xylene oil and an aqueous sulfuric acid solution of about 50% to 70% initial concentration, maintaining this reaction mixture at a temperature of about 85° to 95° C. during sulfonation, removing substantially all water from the sulfonation reaction mixture during the course of sulfonation, removing unreacted hydrocarbons from the sulfonation reaction mixture after sulfonation of meta-xylene is substantially completed, and subjecting the residual sulfonic acid product to hydrolysis and distillation to separate substantially pure meta-xylene as distillate.

2. A process for separating substantially pure meta-xylene from an oil comprising a mixture of xylenes including meta-xylene, which comprises selectively sulfonating meta-xylene in said xylene oil by subjecting to reflux distillation a mixture of said xylene oil and an aqueous sulfuric acid solution of about 50% to 70% initial concentration, maintaining this reaction mixture at a temperature of about 85° to 95° C. during reflux distillation, removing water from the reflux condensate during the course of reflux distillation, removing unreacted hydrocarbons from the sulfonation reaction mixture after sulfonation of meta-xylene is substantially completed, and subjecting the residual sulfonic acid product to hydrolysis by steam distillation at a temperature of about 140° C. to separate substantially pure meta-xylene as distillate.

3. A process for separating substantially pure meta-xylene from an oil comprising a mixture of xylenes including meta-xylene, which comprises selectively sulfonating meta-xylene in said xylene oil by preparing a mixture of said xylene oil and an aqueous sulfuric acid solution of about 50% to 70% concentration containing approximately the theoretical amount of sulfuric acid for reaction with meta-xylene, subjecting this mixture to reflux distillation, maintaining the mixture at a temperature of about 85° to 95° C. during reflux distillation, removing water from the reflux condensate during the course of reflux distillation and continuing reflux distillation with removal of water until the sulfuric acid is substantially completely reacted, removing unreacted hydrocarbons from the sulfonation reaction mixture, and subjecting the residual sulfonic acid product to hydrolysis and distillation to separate substantially pure meta-xylene as distillate.

4. A process for separating substantially pure meta-xylene from an oil comprising a mixture of xylenes including meta-xylene, which comprises selectively sulfonating meta-xylene in said xylene oil by preparing a mixture of said xylene oil and an aqueous sulfuric acid solution of about 60% concentration containing approximately the theoretical amount of sulfuric acid for reaction with meta-xylene, subjecting this mixture to reflux distillation, maintaining the mixture at a temperature of about 90° C. during reflux distillation, removing water from the reflux condensate during the course or reflux distillation and continuing reflux distillation with removal of water until the sulfuric acid is substantially completely reacted, removing unreacted hydrocarbons from the sulfonation reaction mixture, and subjecting the residual sulfonic acid product to hydrolysis by steam distillation at a temperature of about 140° C. to separate substantially pure meta-xylene as distillate.

PERCY JULIUS COLE.